United States Patent [19]
Webb et al.

[11] Patent Number: 5,969,486
[45] Date of Patent: Oct. 19, 1999

[54] DETECTING HORIZONTAL BLANKING TIME IN CATHODE RAY TUBE DEVICES

[75] Inventors: James R. Webb, Boulder; Ron C. Simpson, Erie, both of Colo.

[73] Assignee: Display Laboratories, Inc., Boulder, Colo.

[21] Appl. No.: 08/908,859

[22] Filed: Aug. 8, 1997

Related U.S. Application Data

[60] Provisional application No. 60/036,577, Jan. 16, 1997.

[51] Int. Cl.[6] ............................. H04N 3/24; H04N 3/16
[52] U.S. Cl. ........................ 315/384; 315/370; 315/400; 348/637
[58] Field of Search .................................. 315/384, 385, 315/386, 400, 370; 348/637

[56] References Cited

U.S. PATENT DOCUMENTS

| | | | |
|---|---|---|---|
| 3,944,884 | 3/1976 | Wilocki | 315/400 |
| 3,961,223 | 6/1976 | Ray et al. | |
| 3,995,269 | 11/1976 | Schumacher | |
| 4,058,826 | 11/1977 | Schneider | |
| 4,081,835 | 3/1978 | Klein | 358/165 |

(List continued on next page.)

FOREIGN PATENT DOCUMENTS

| | | | |
|---|---|---|---|
| 0 442 267 A2 | 9/1991 | European Pat. Off. | H04N 17/04 |
| 06303624 | 10/1994 | Japan . | |

OTHER PUBLICATIONS

James R. Webb; Micro–Chip Architecture for Full Digital Control of Geometry, Convergence and Colorimetry in CRT Monitors, Jun. 1994.

Charles Chuang et al.; A Non–Impact High Resolution Geometry Alignment System for Monitor Production. Paper given at Society for Information Display, San Jose, California, Jun. 1994.

Society for Information Display International Symposium, Digest of Technical Papers, vol. XXV, Jun. 14–16, 1994.

CRT Display Inspection with a Solid State Camera, by Gregory A. Kern. Paper given at Society for Information Display, San Jose, California, Jun. 1994.

(List continued on next page.)

*Primary Examiner*—Edward P. Westin
*Assistant Examiner*—Shane R. Gardner
*Attorney, Agent, or Firm*—William W. Cochran, II; Richard J. Holzer, Jr.

[57] ABSTRACT

An apparatus and method are disclosed for generating timing pulses to control various functions in a video monitor including the switching of video amplifiers in cathode ray tube (CRT) devices, the control of the phase and frequency of phase locked loops, etc. Unlike previous methods, where switching is timed and controlled by monitoring the retrace voltage level, the system of the present invention monitors the change in direction of current in the retrace tuning capacitor. Monitoring the retrace capacitor current, provides an extremely accurate method for timing in horizontal deflection circuits. The apparatus of the present the invention comprises a small bead inductor placed in the current path of a horizontal retrace capacitor within the horizontal deflection circuit of the cathode ray tube device. Measuring the voltage across the bead inductor allows a very precise monitoring of the current through the retrace tuning capacitor. By designing the size of the bead inductor as disclosed, precise electrical pulses can be generated and detected during the retrace time of the CRT electron beam. These precise pulses are then used to generate accurate control signals for use within the CRT device. The invention also discloses an apparatus and method that minimizes left side ringing distortion in cathode ray tube video displays. Left side ringing is reduced due to the addition of the bead inductor to the horizontal deflection circuit, which lowers the stray resonant frequency within the horizontal deflection circuit.

31 Claims, 10 Drawing Sheets

U.S. PATENT DOCUMENTS

| | | | |
|---|---|---|---|
| 4,139,799 | 2/1979 | Kureha et al. . | |
| 4,169,988 | 10/1979 | Fecht | 315/371 |
| 4,201,932 | 5/1980 | Smith . | |
| 4,263,615 | 4/1981 | Steinmetz et al. | 358/148 |
| 4,272,705 | 6/1981 | Beaumont | 315/408 |
| 4,275,354 | 6/1981 | Suematsu et al. . | |
| 4,281,340 | 7/1981 | Mitamura et al. . | |
| 4,314,179 | 2/1982 | Tooyama et al. . | |
| 4,385,259 | 5/1983 | Chase et al. . | |
| 4,409,523 | 10/1983 | Yasumura . | |
| 4,501,995 | 2/1985 | Olmstead et al. | 315/371 |
| 4,506,292 | 3/1985 | Newton et al. . | |
| 4,516,058 | 5/1985 | Hafer . | |
| 4,518,898 | 5/1985 | Tarnowski et al. . | |
| 4,523,188 | 6/1985 | Huber . | |
| 4,547,708 | 10/1985 | Haferl . | |
| 4,549,117 | 10/1985 | Takahashi et al. . | |
| 4,551,657 | 11/1985 | Miller et al. . | |
| 4,555,649 | 11/1985 | Sharma . | |
| 4,588,929 | 5/1986 | Wedam et al. . | |
| 4,612,482 | 9/1986 | Baemon, III et al. . | |
| 4,617,495 | 10/1986 | Culter . | |
| 4,620,136 | 10/1986 | Bolger . | |
| 4,625,154 | 11/1986 | Willis | 315/371 |
| 4,631,576 | 12/1986 | St. John . | |
| 4,641,062 | 2/1987 | Pons . | |
| 4,649,324 | 3/1987 | Guerra et al. . | |
| 4,649,421 | 3/1987 | Kodama et al. . | |
| 4,652,920 | 3/1987 | Dietz | 358/165 |
| 4,672,275 | 6/1987 | Ando . | |
| 4,695,772 | 9/1987 | Lau et al. . | |
| 4,754,204 | 6/1988 | Ando et al. . | |
| 4,757,239 | 7/1988 | Starkey, IV . | |
| 4,766,354 | 8/1988 | Oliver | 315/371 |
| 4,767,971 | 8/1988 | Onozawa et al. | 315/384 |
| 4,772,948 | 9/1988 | Irvin . | |
| 4,777,411 | 10/1988 | O'Connor et al. | 315/371 |
| 4,789,811 | 12/1988 | Hulshof . | |
| 4,795,946 | 1/1989 | Nishiyama | 315/370 |
| 4,799,000 | 1/1989 | Close . | |
| 4,808,891 | 2/1989 | Watanuki et al. | 315/411 |
| 4,810,939 | 3/1989 | Watanabe et al. . | |
| 4,816,908 | 3/1989 | Colineau et al. . | |
| 4,817,038 | 3/1989 | Knoll et al. . | |
| 4,818,919 | 4/1989 | Kobayashi et al. . | |
| 4,857,998 | 8/1989 | Tsujihara et al. . | |
| 4,859,915 | 8/1989 | Decraemer . | |
| 4,872,060 | 10/1989 | Micic et al. | 358/242 |
| 4,887,011 | 12/1989 | Haynie et al. . | |
| 4,896,081 | 1/1990 | Ichigaya et al. . | |
| 4,896,082 | 1/1990 | Geiger . | |
| 4,935,675 | 6/1990 | Ochiai . | |
| 4,952,851 | 8/1990 | Macaulay . | |
| 5,020,116 | 5/1991 | Macaulay . | |
| 5,034,667 | 7/1991 | Lendaro | 315/411 |
| 5,059,979 | 10/1991 | Micic et al. . | |
| 5,081,523 | 1/1992 | Frazier . | |
| 5,113,122 | 5/1992 | Bando et al. . | |
| 5,115,171 | 5/1992 | Haferl . | |
| 5,155,417 | 10/1992 | Tateishi . | |
| 5,164,639 | 11/1992 | Shimaoka et al. . | |
| 5,179,322 | 1/1993 | Gibbs et al. | 315/370 |
| 5,194,784 | 3/1993 | Tripod . | |
| 5,214,499 | 5/1993 | Gleim et al. . | |
| 5,216,504 | 6/1993 | Webb et al. . | |
| 5,220,251 | 6/1993 | Gawell et al. . | |
| 5,237,246 | 8/1993 | Gleim et al. . | |
| 5,276,458 | 1/1994 | Sawdon . | |
| 5,294,866 | 3/1994 | Miyazaki et al. . | |
| 5,300,865 | 4/1994 | Koblitz et al. | 315/384 |
| 5,345,262 | 9/1994 | Yee et al. . | |
| 5,355,058 | 10/1994 | Jackson et al. . | |
| 5,369,499 | 11/1994 | Yip . | |
| 5,398,083 | 3/1995 | Tsujihara et al. . | |
| 5,399,945 | 3/1995 | Haferl | 315/371 |
| 5,402,044 | 3/1995 | Haferl et al. | 315/371 |
| 5,420,483 | 5/1995 | Suzuki et al. . | |
| 5,420,645 | 5/1995 | Traa et al. . | |
| 5,432,548 | 7/1995 | Byen et al. . | |
| 5,434,483 | 7/1995 | Yang et al. . | |
| 5,434,484 | 7/1995 | Murakami . | |
| 5,434,595 | 7/1995 | Macaulay . | |
| 5,436,677 | 7/1995 | Suzuki et al. . | |
| 5,504,521 | 4/1996 | Webb et al. . | |
| 5,506,481 | 4/1996 | Wada et al. . | |
| 5,510,833 | 4/1996 | Webb et al. . | |
| 5,512,964 | 4/1996 | Kim . | |
| 5,528,112 | 6/1996 | George et al. . | |
| 5,537,159 | 7/1996 | Suematsu et al. . | |
| 5,592,240 | 1/1997 | Sakamoto et al. . | |

OTHER PUBLICATIONS

Firmware for a Continuous Frequency CRT Monitor, by Steven J. Lassman. Paper given at Society for Information Display, San Jose, California 1994.

Society for Information Display, Digest of Technical Papers, Feb. 6–8, 1996.

SGS–Thomson Catalog of Components for Multisync on Screen Display for Monitor.

Display Laboratories, Inc., MIMicam™ Automated Monitor Alignment & Inspection System, 1994.

Display Laboratories, Inc., DLAB43A, Advanced Information, 1995.

Display Laboratories, Inc., DLAB62A, Advanced Information, 1995.

Display Laboratories, Inc., DLAB494, Advanced Information, 1995.

Display Laboratories, Inc., DLAB520A, Advanced Information, 1995.

James E. Thario, Craig T. Ridgley, Display Laboratories, Inc., Auto–Compensation of CRT Alignment for Magnetic Field Influence.

Arjun Ramamurthy, Alan Fridge, Distortion Measurement and Simultaneous Adjustment of Multiple Interacting Controls on CRT Monitors. Paper given at Society Information Display, San Jose, California, Feb. 6–8, 1994.

DETECTING HORIZONTAL BLANKING TIME IN CATHODE RAY TUBE DEVICES

CROSS-REFERENCE TO RELATED APPLICATIONS

This application claims the benefit of U.S. Provisional Application No. 60/036,577, filed Jan. 16, 1997.

BACKGROUND OF THE INVENTION

A. Field of the Invention

This invention pertains generally to raster scanned cathode ray tubes (CRTs) and more particularly to generating a precisely timed blanking pulse in a CRT horizontal deflection circuit.

B. Definitions

Bead inductor means an inductive electronic component that is designed to saturate at a predetermined current level.

Bead transformer means a bead inductor that is configured as a transformer.

Blank means to cause a video image to be substantially not visible on a cathode ray tube screen.

Blanking means to blank or unblank.

Cathode ray tube monitor means a device for viewing a video image using a cathode ray tube device.

Circuit resonance means a resonate frequency oscillation that occurs in a circuit due to the circuit architecture.

Control signal means a signal generated for the purpose of initiating an action or event.

Current path means the route of flow of current in a circuit.

Decode means to identify an outcome based upon an input.

Decoder means a device that decodes.

Detector means a device that senses an input and is capable of generating an output indicating that an input has been sensed.

Direction of current flow changes means a change in current about a zero point.

Electrical pulse means any pulse comprised of current, voltage, energy, or any other measurable electrical component or combination thereof.

Horizontal deflection circuit means circuitry in a cathode ray tube device that is used to control the horizontal deflection of an electron beam.

Horizontal trace means a path of an electron beam across a cathode ray tube that is intended to occur while a video signal is being applied to said electron beam.

Inductor means an inductive electronic component.

Inverter means a device that reverses the polarity of a signal.

Left side ringing means a type of video image distortion characterized by vertical bars at the beginning of a trace of a CRT raster typically on the left side of a CRT screen.

Logic circuit means a device that performs binary operations.

Retrace tuning capacitor means a capacitor that stores energy to create a retrace pulse in a cathode ray tube horizontal deflection circuit.

Switching signals means signals that are capable of turning other circuitry on and off.

Unblank means to not blank.

Video amplifier means a device for amplifying a video signal.

Video image means the displayed image that appears on the cathode ray tube screen which is produced in response to an input video signal.

Video signal means the electronic signal that is applied to the electron guns of a cathode ray tube.

C. Description of the Background.

In cathode ray tube devices, video amplifiers are unblanked during the trace time when the electron beam is tracing the video image (from left to right) and blanked, during the retrace time, while the electron beam is being moved back from right to left, in order to begin the trace of the next image line on the CRT raster. This blanking of the signal amplifiers is done to hide both the horizontal and vertical retrace lines which would be visible in the video image if the amplifiers were not blanked. Also, if the video image is not accurately centered, leaving the video amplifiers unblanked would result in the image being folded or wrapped around the edge of the raster. When horizontal blanking is working well, an off-center picture will be blanked at the edge of the raster and will not be folded back around the CRT screen.

As cathode ray tube devices have become faster and operate at ever higher frequencies, the problem of detecting when, during trace, to blank the video amplifiers and before retrace begins, has become more difficult. This is primarily due to the shorter time period available in which to detect a raster edge and to reverse scan direction. In fact, the duration of time required to switch some semiconductor components commonly used in horizontal deflection circuits is nearly as long as one third of the total trace time. Also the operating characteristics of semiconductor components used in horizontal deflection circuits for switching may vary with environmental conditions further confounding the use of these components for timing.

The usual method of determining the horizontal retrace time is to detect the beginning and end of the horizontal retrace pulse. This pulse is typically 1,000 to 1,500 volts and lasts for the duration of the horizontal retrace. The ending edge of this high voltage pulse is easy to detect because the trailing edge of the pulse falls very quickly, crosses ground (zero volts), and ends slightly below ground. A voltage comparator having a reference voltage set at approximately the ground voltage is capable of detecting the end of the retrace pulse. On the other hand, detecting the start of the retrace pulse or the end of the horizontal trace is very difficult. The difficulty arises because the start of the retrace pulse has a slow rise time and is dependent upon the operating characteristics of the horizontal switching transistor. The operational characteristics of the horizontal switching transistor may vary significantly with time, temperature, and load. Also, because the shape of the voltage curve during the first 10 to 20 volts of the horizontal pulse voltage curve is so unpredictable, the reference voltage input of a voltage comparator used to detect the start of the horizontal retrace pulse must be set high, which causes a time delay in detecting the start of the retrace. This delay adds to the delay of the video amplifier switching circuit, and makes it generally impossible to detect the start of retrace during the current fall time of the horizontal switch transistor. Another problem with the present detection method is that it is difficult and expensive to build a voltage comparator that can handle 1,000 volt pulses and still accurately measure voltage in the range of 10 volts.

In summary, when using the typical voltage detection method for timing CRT horizontal deflection circuits, it is easy to detect the end of a retrace (start of a trace), but difficult to detect the end of a trace (start of retrace). This creates difficulty in determining when to blank the video amplifiers. Often, when using the usual detection method, the horizontal trace reaches the right edge of the raster and has reversed direction before detection is accomplished and before the video amplifiers are blanked. Because of these problems it would, therefore, be desirable to provide an accurate method of determining the beginning of the retrace pulse so that the video amplifiers can be accurately switched at the appropriate times. It is against this background, and the limitations and problems associated therewith, that the present invention has been developed.

SUMMARY OF THE INVENTION

The present invention overcomes the disadvantages and limitations of the prior art by providing a system to accurately determine the beginning and end of the retrace pulse generated by the horizontal deflection circuitry of a cathode ray tube device.

The present invention may therefore comprise an apparatus for generating a control signal in response to precisely timed electrical pulses produced in a cathode ray tube horizontal deflection circuit comprising an inductor placed in series with a retrace tuning capacitor that produces the precisely timed electrical pulses, and, decoder circuitry that generates the control signal in response to the precisely timed electrical pulses in the cathode ray tube horizontal deflection circuit.

The present invention may also comprise a method for generating a control signal for blanking the video amplifiers of a cathode ray tube monitor comprising the steps of, detecting electrical pulses produced across an inductor placed in series with the retrace capacitor and a horizontal deflection circuit of the cathode ray tube monitor that are generated as the direction of current flow changes through the retrace capacitor, and generating the control signal in response to the electrical pulses.

The present invention may also comprise an apparatus for reducing left side ringing distortion in a cathode ray tube horizontal deflection circuit comprising, an inductor disposed in the cathode ray tube horizontal deflection circuit in series with the retrace tuning capacitor.

The present invention may also comprise a method of reducing left side ringing, distortion in a cathode ray tube horizontal deflection circuit comprising the steps of, placing an inductor of a predetermined value in the current path of a retrace tuning capacitor and a dampening diode disposed in said cathode ray tube horizontal deflection circuit that lowers the circuit resonant frequency.

An advantage of placing a bead inductor in the current path of the horizontal retrace tuning capacitor is that the bead inductor allows very accurate monitoring of the current in the retrace tuning capacitor and provides additional inductance to lower the circuit resonance of a circuit comprising a retrace tuning capacitor, the associated lead and wiring inductance, and a damper diode. The bead inductor generates small precise voltage pulses during retrace which can be easily detected and used to generate control signals for switching the video signal amplifiers.

Other advantages of the present invention are that it provides a way of accurately generating control signals for precise timing in the horizontal deflection circuit of cathode ray tube devices. The present invention is easily implemented while being more precise and economical than previous methods and apparatus. An additional advantage of the present invention is that placing the retrace bead inductor in the horizontal deflection circuitry reduces left side ringing distortion by slowing and suppressing stray resonant oscillations in the circuit.

The present invention therefore overcomes the disadvantages and limitations of the prior art by providing precise detection of the beginning and/or end of a retrace interval in devices using raster scanning of cathode ray tubes for image display. The system of the present invention provides for a very precise way of generating a timing pulse that can be used to switch the video amplifiers to facilitate the creation of accurate video image displays with minimum edge jitter on CRT devices, to control the phase and/or frequency of a phase locked loop, or other uses of a timing pulse that may arise in a cathode ray tube monitor. Unlike the prior technique of measuring voltage during trace time, the present invention monitors current in the retrace tuning capacitor during the trace interval and is considerably faster, more accurate, and economical than previous methods.

DETAILED DESCRIPTION OF THE PREFERRED EMBODIMENT OF THE INVENTION

Figure 1:
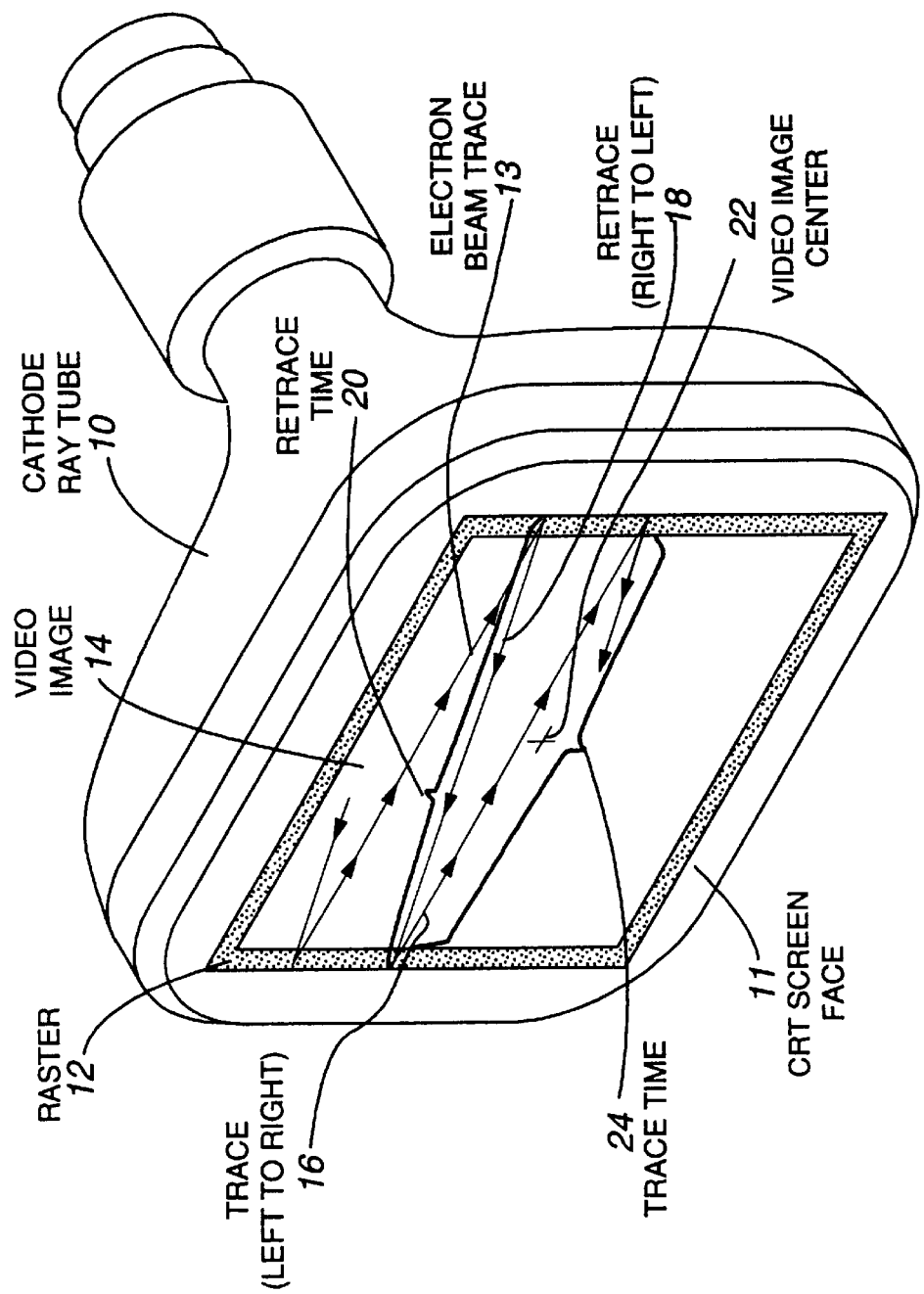
FIG. 1 is an isometric illustration of a cathode ray tube with a raster, a video image and some associated trace and retrace scans schematically illustrated on its face.

FIG. 1 discloses a cathode ray tube (CRT) 10 having a raster 12 and video image 14 displayed the cathode ray tube screen face 11. Associated with the display on the CRT screen face 11 is the electron beam trace 13. The left to right trace 16 begins at the left edge of the CRT raster 12 and reverses and becomes the right to left retrace 18 at the right edge of the CRT raster 12. Upon reaching the left edge of the CRT raster 12 the electron beam trace 13 reverses and again goes left to right as shown by trace 16. The cathode ray tube video amplifiers are turned off or blanked during the entire retrace time 20 of retrace 18. The video amplifiers are turned on or unblanked during the trace time 24 so that the CRT video image 14 can be generated on the CRT screen face 11. The center of the video image 22 is also illustrated.

Figure 2:
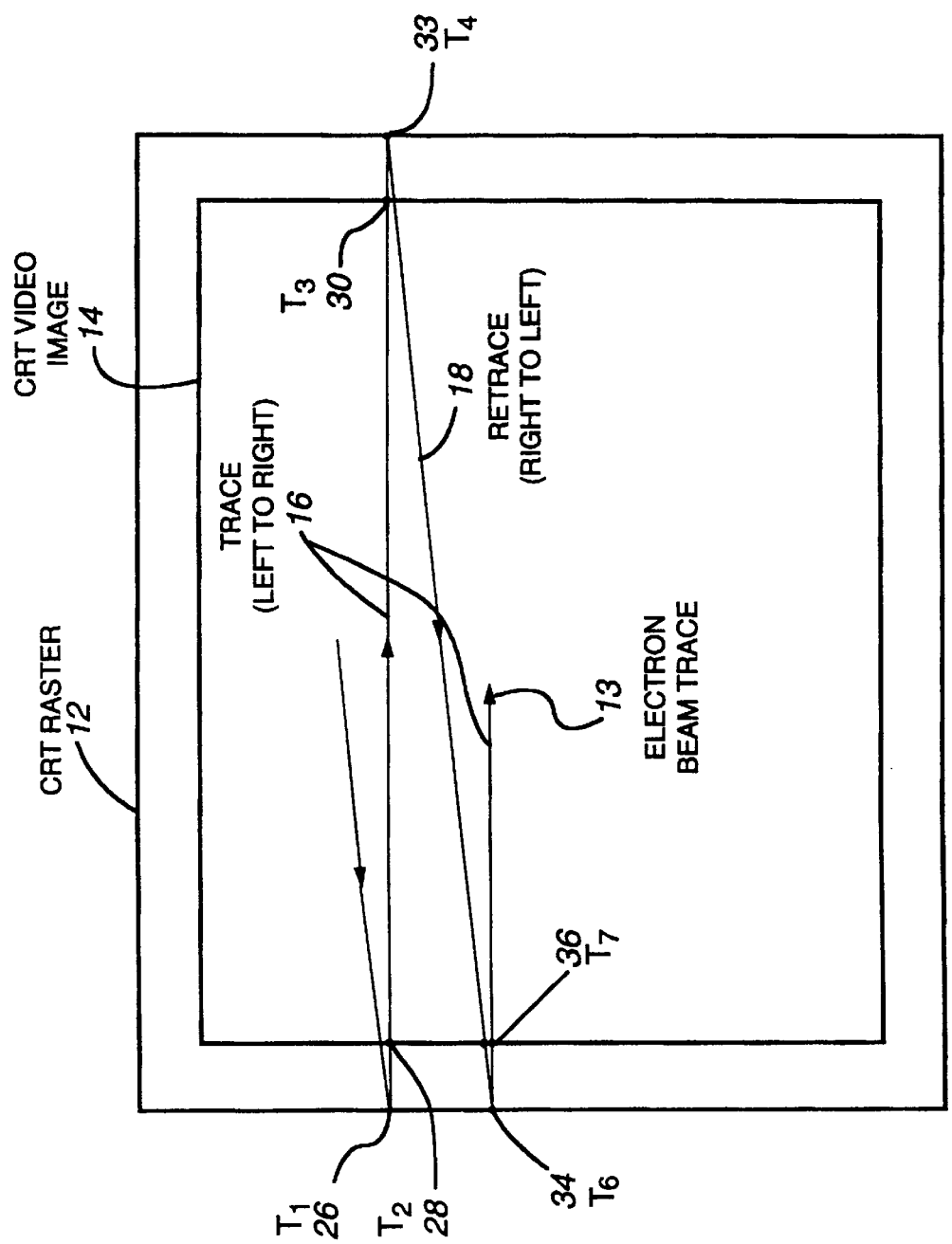
FIG. 2 is a schematic illustration of a cathode ray tube raster and associated video image.

FIG. 2 is a schematic illustration of a CRT raster 12, video image 14 and the time periods associated with electron beam trace 13. As shown in FIG. 2, the electron beam trace 13 is located at point 26 at time T1. By the time the electron beam 13 is at point 28 at time T2, the video signal amplifiers must be unblanked to start generating the CRT video image 14. The video image 14 is generated until the electron beam trace 13 reaches point 30 at time T3 after which the video signal amplifiers are blanked, which occurs just before the electron beam reaches the right edge of CRT raster 12. At time T4, when the electron beam is at point 33, retrace 18 begins. The video signal amplifiers remain blanked during the entire time of the retrace 18 so that the retrace 18 of the electron beam 13 is not visible on video image 14. The end of electron beam retrace 18 occurs at point 34 at time T6 when the electron beam 13 again reaches the left edge of the CRT raster 12. The electron beam trace 13 begins again at point 34. Just after time (T6) the video signal amplifiers are again unblanked and can begin generating the video image 14 at point 36 at time T7 on CRT raster 12. The minimum distance between the CRT raster 12 and the CRT video image 14 is representative of the time required to blank or unblank the video signal amplifiers and is measured, for example, by the time difference between point 26 at time T1 and point 28 at time T2, or point 30 at T3 and point 33 at T4. It is important to note that at the now typical horizontal synchronization frequencies of 50 khz to 100 kHz, the time required to blank or unblank the video amplifiers ranges from 100 to 200 nanoseconds. Accurate blanking at these frequencies is a difficult problem in cathode ray tube device design.

Figure 3:
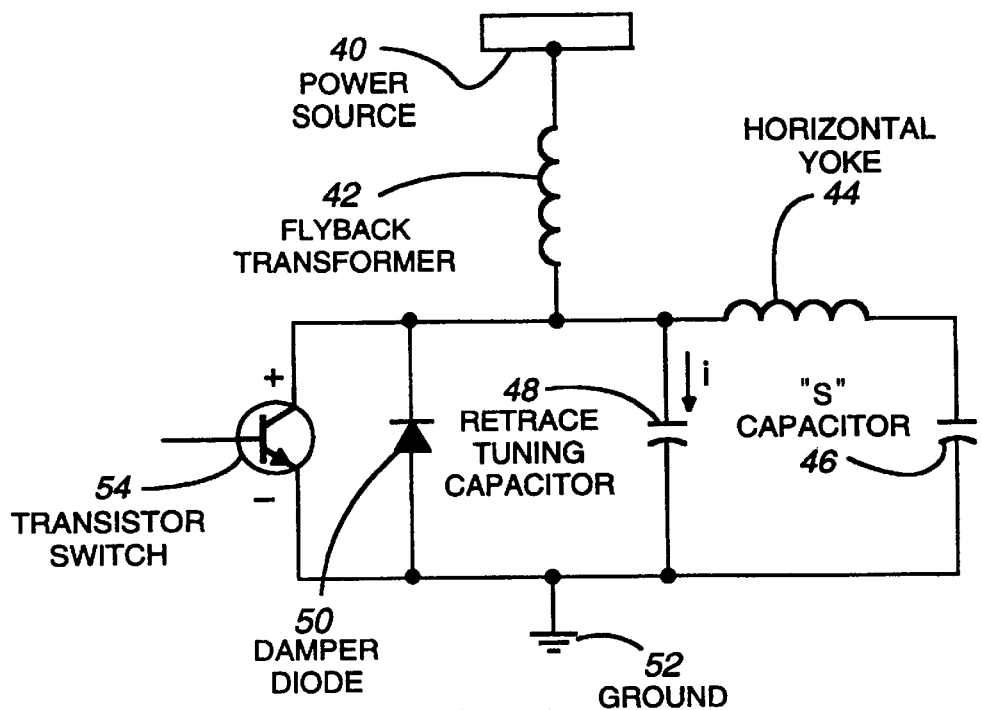
FIG. 3 is a schematic circuit diagram of a typical horizontal deflection circuit for a raster scanned cathode ray tube device.

FIG. 3 is a schematic circuit diagram of a typical horizontal deflection circuit cathode ray tube device. This circuit is comprised of the following components: a power source 40 connected to flyback transformer or feed inductor 42; a transistor switch 54, controlled by the horizontal sync signal; a damper diode 50; a ground potential 52; a retrace tuning capacitor 48; a horizontal yoke 44 that quickly moves the CRT electron beam from right to left; and an S capacitor 46 that supplies current to the horizontal yoke during the trace interval. The signals generated in the horizontal deflection circuit are instrumental in the creation of an accurate video image on the CRT and the ability to generate accurate synchronization with other CRT device circuitry is of utmost importance in CRT monitor design.

Figure 4:
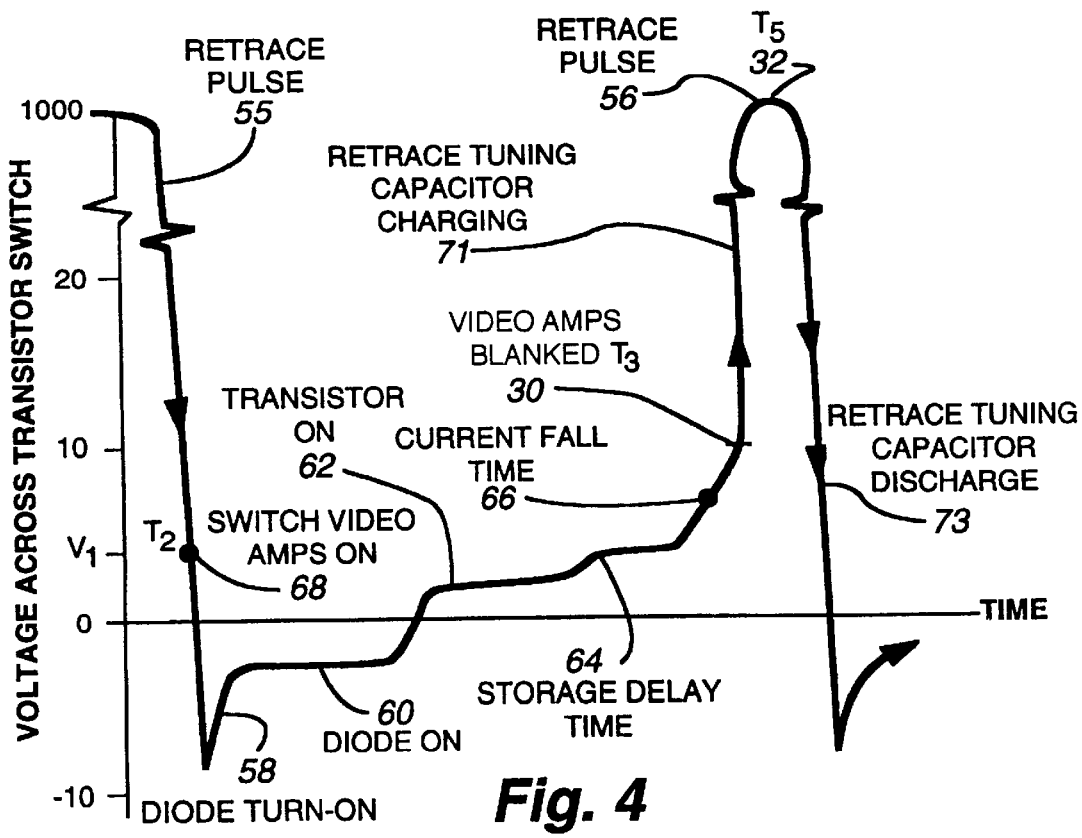
FIG. 4 is a voltage versus time waveform drawing showing the voltage waveform across the transistor switch of the typical horizontal deflection circuit illustrated in FIG. 3.

FIG. 4 discloses a time versus voltage graph of the voltage across transistor switch 54. FIG. 4 illustrates typical flyback or retrace pulses 55, 56 and the events that typically occur between consecutive retrace pulses which influence detection of the retrace pulses 55, 56 in the horizontal deflection circuit of FIG. 3. A voltage comparator (not shown) having a reference voltage V1, set just above the ground level, detects the falling voltage of retrace pulse 55. At time T2 when retrace pulse 55 reaches the preset reference voltage V1, the video signal amplifiers are unblanked. This occurs just before the retrace pulse 55 reaches zero volts. The retrace pulse 55 continues to fall and momentarily drops below zero volts, and then begins to rebound when the damper diode 50 turns on at time 58. It takes some time for the damper diode 50 (FIG. 3) to completely switch on as illustrated at point 60 on the voltage curve. Then as the voltage rises above zero, the transistor switch 54 (FIG. 3) is turned on at point 62. There is another delay 64, known as storage delay, as the transistor is turned off ending with a period known as the current fall time 66. At approximately 10 to 15 volts the video signal amplifiers are blanked at time T3 as indicated at point 30 of the voltage curve. At point 30 the voltage rises quickly as the retrace tuning capacitor is charged, as indicated by point 71 on the voltage curve. The retrace tuning capacitor 48 (FIG. 3) is fully charged at point 32, which is the top of retrace pulse 56 (time T5). At point 73 tuning capacitor 48 (FIG. 3) discharges through the horizontal yoke 44 (FIG. 3) and the voltage across the retrace tuning capacitor 48 falls rapidly as the cycle begins again.

Figure 5:
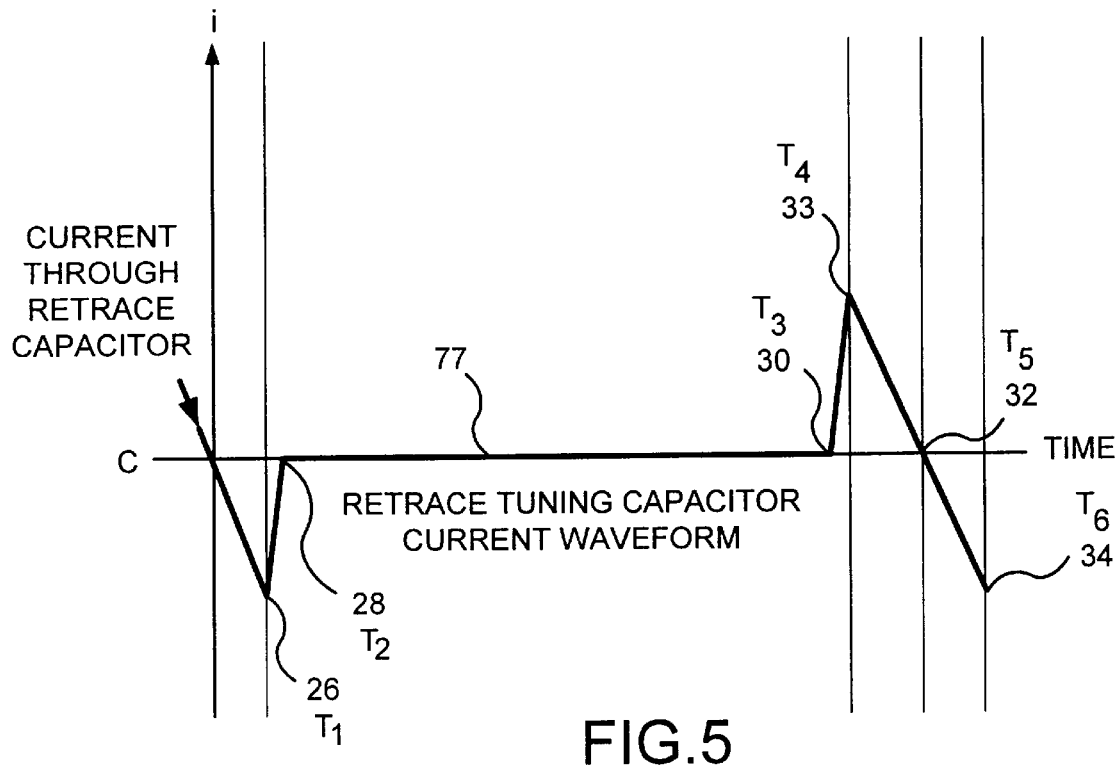
FIG. 5 is a schematic illustration illustration of a current versus time waveform for current through the retrace tuning capacitor for the horizontal deflection circuit in FIG. 3.

Inspection of the retrace capacitor current versus time graph, schematically illustrated in FIG. 5, reveals two very distinct current spikes in the retrace tuning capacitor current waveform 77 that is created as the retrace capacitor 48 (FIG. 3) charges and discharges. Point 26 (time T1) on current waveform 77 corresponds to the end of retrace pulse 55 which is the time when the retrace tuning capacitor 48 (FIG. 3) has just finished discharging through the horizontal yoke 44 (FIG. 3). The current in the retrace tuning capacitor 48 then quickly returns to zero as damper diode 50 conducts, and remains close to zero during the remainder of the trace interval. While transistor switch 54 is on, S capacitor 46 charges and discharges through horizontal yoke 44 to cause the electron beam to deflect from left to right as shown by trace 16 (FIG. 1). When transistor switch 54 is turned off, the retrace tuning capacitor begins to charge again from current provided from the horizontal yoke. The current increases nearly instantly in the retrace tuning capacitor 54 as current stops flowing through transistor switch 54 and begins to flow through the retrace tuning capacitor. At point 32, the retrace tuning capacitor 48 is fully charged and begins to discharge through the horizontal yoke 44. This causes the direction of current flow in horizontal yoke 44 and retrace tuning capacitor 48 to reverse. The current through the retracing tuning capacitor 48 reaches a negative peak voltage at point 34 (T6) having a value equal to the peak value at point 33 with an opposite polarity. The cycle then begins again. As can be seen from FIG. 5, the current flowing through the retrace tuning capacitor provides a convenient waveform to detect the start and end of the horizontal trace of the electron beam.

Figure 6:
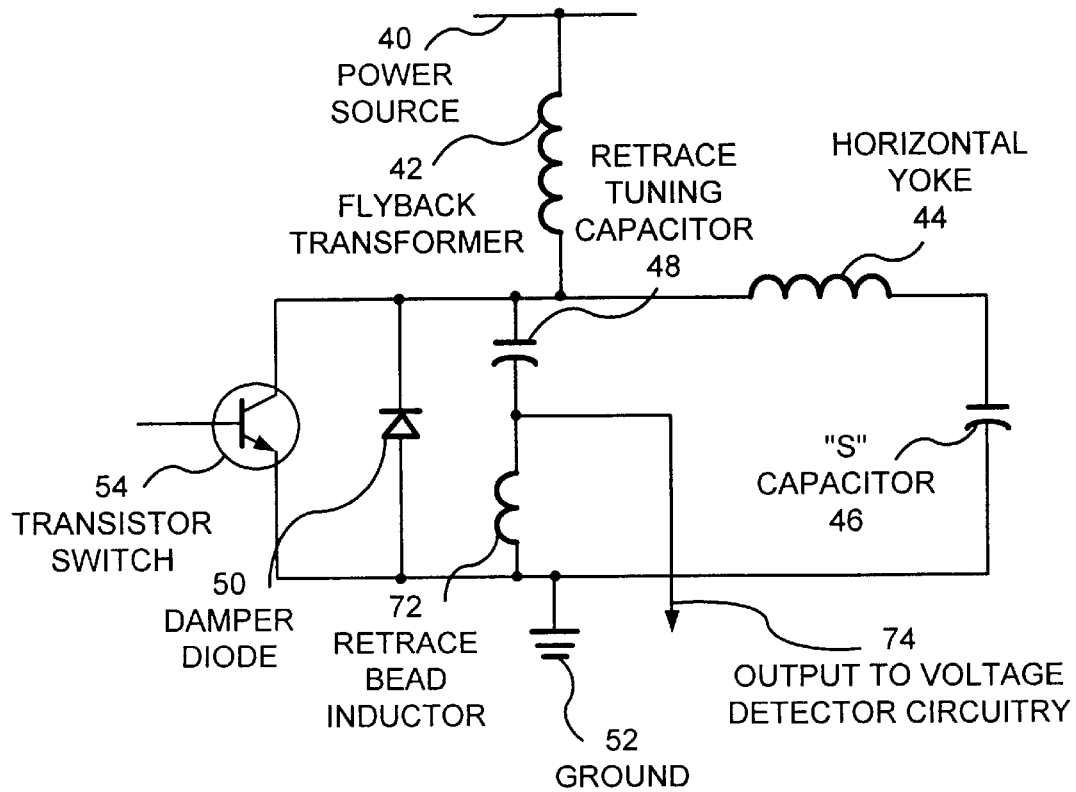
FIG. 6 is a schematic circuit diagram illustrating the horizontal deflection circuitry of one embodiment of the present invention.

FIG. 6 is a schematic circuit diagram illustrating an embodiment of the invention for monitoring the current waveform of the retrace tuning capacitor depicted in FIG. 5. A properly sized inductor 72 is added to the circuit in the current path of retrace tuning capacitor 48. The voltage across inductor 72 can be monitored through output line 74 which may be connected to a pulse detector and timing circuitry. Various size voltage pulses can be generated across the inductor 72 by varying the value of its inductance. The size of the voltage pulse produced across the inductor is proportional to the rate of change of current times the inductance provided the inductor 72 does not saturate. Should the inductor saturate, its inductance will drop rapidly, as will the voltage across it. A bead type inductor can be selected to produce a detectable voltage pulse just as current starts to flow at the beginning of retrace, at center of retrace, and again at the very end of retrace. In other words, as current begins to flow in the bead inductor 72, the bead inductor 72 appears as a very high impedance, i.e., an open circuit. Hence, the voltage rises very quickly across the bead inductor. As current builds, the bead inductor 72 is rapidly saturated and becomes a short circuit so that the voltage drop across bead inductor 72 goes to zero. The end result is that a voltage pulse of short duration is produced across bead inductor 72. The physical size of bead inductor 72 affects the time required to reach saturation, which, in turn, affects the temporal location of the center of the electrical pulse.

The sizing of the retrace bead inductor 72 is important. The bead inductor must saturate before full yoke current in order to produce an easily detectable voltage pulse at the start of retrace. If the inductance of the retrace bead inductor 72 is too large, the voltage pulse produced across the bead inductor will be wide and not centered near the start and end of the trace.

Figure 7:
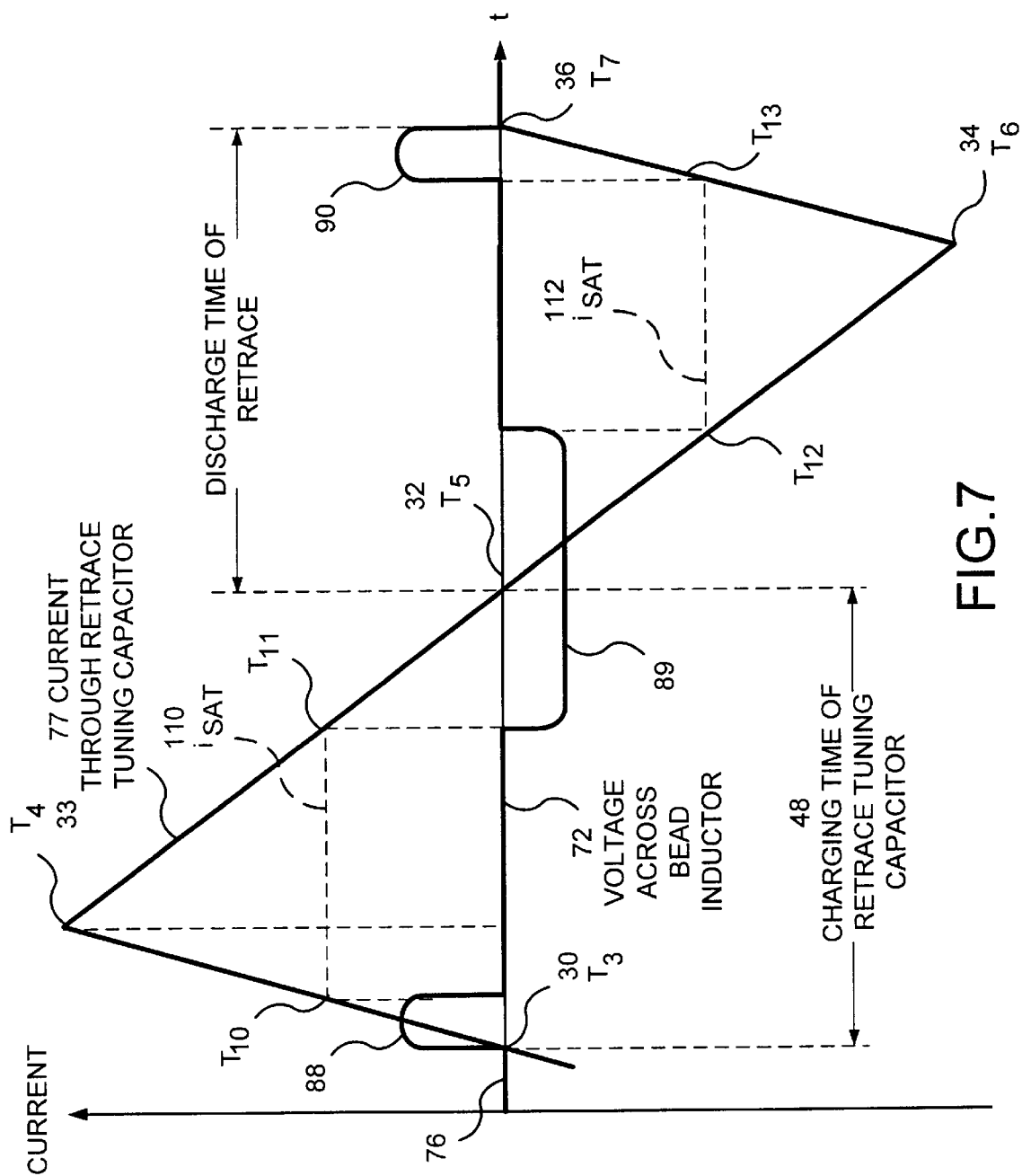
FIG. 7 is a schematic illustration of a voltage versus time waveform for the voltage across the retrace bead inductor of the horizontal deflection circuit illustrated in FIG. 6.

FIG. 7 is a schematic waveform diagram showing a plot of time versus voltage across bead inductor 72. Also, superimposed upon this waveform, is the retrace tuning capacitor current waveform 77 illustrated in FIG. 5. Inspection of the retrace bead inductor voltage waveform 76 shows that as current rapidly rises to charge the retrace tuning capacitor at point 30 (time T3), a voltage pulse 88 is generated across the retrace bead inductor 72 because bead inductor 72 initially appears as a high impedance to the rapidly changing current until it quickly becomes saturated at time T10 (isat 110). When bead inductor 72 is saturated it acts like a low impedance and the voltage drops back to near zero ending voltage pulse 88. The retrace tuning capacitor 48 (FIG. 6) continues to charge until the current flowing through the retrace tuning capacitor 48 has fallen to zero at point 32 (time T5). However, at T11 the current through the retrace tuning capacitor decreases sufficiently to allow the bead inductor to desaturate and produce a reverse voltage pulse 89. The reverse voltage pulse 89 continues until the bead inductor saturates in a reverse direction at point T12 (−isat 112). Hence, the discharge pulse 89 is centered about the zero current level of current flow through the retrace tuning capacitor. At point 34 (time T6), the current through bead inductor 72 starts rapidly returning to zero. The retrace bead inductor 72 desaturates at T13 and produces pulse 90. Pulse 90 continues until the current goes to zero at point T7 when the current flow is transferred to the damper diode. Since the retrace bead inductor voltage pulses essentially occur during retrace time, the blanking video signal amplifiers from these pulses is extremely precise.

Figure 8:
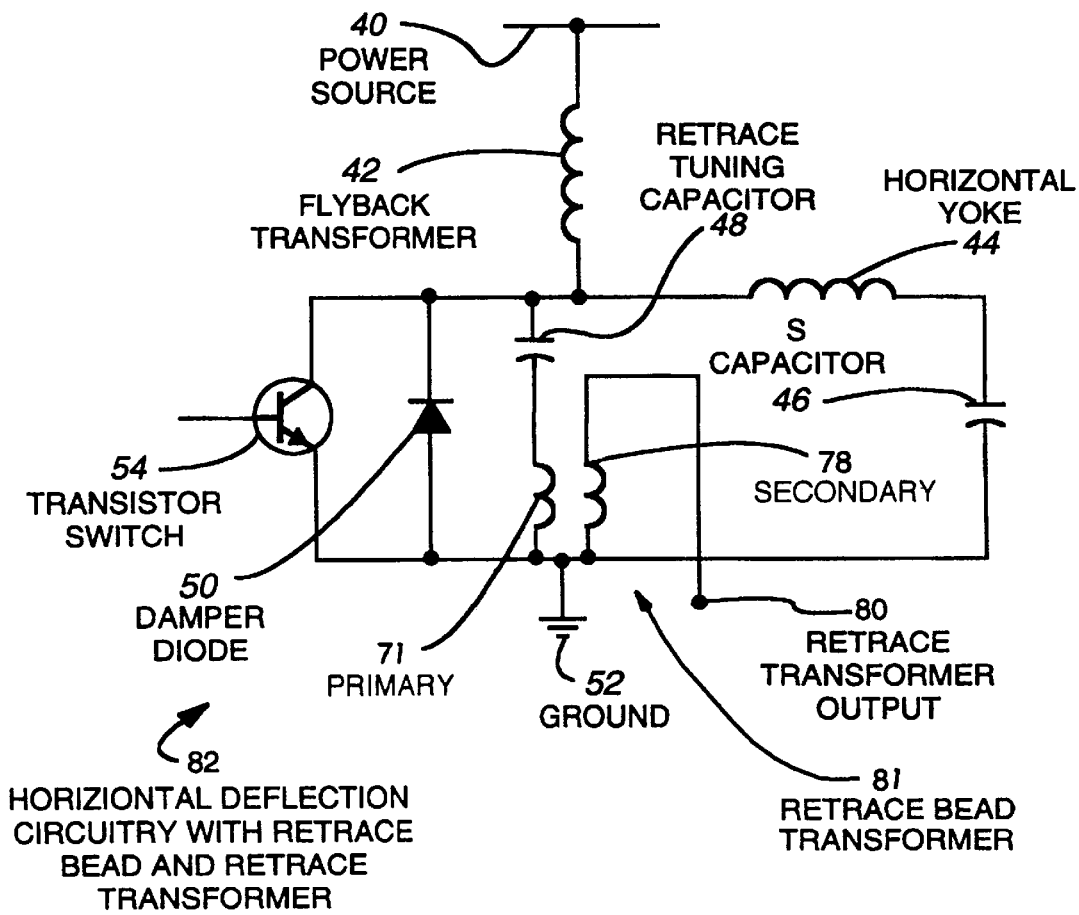
FIG. 8 is a schematic illustration of the horizontal deflection circuitry of the present invention that uses a retrace bead transformer.

FIG. 8 is a schematic circuit diagram of a horizontal deflection circuit that employs a retrace bead transformer 81 having a primary winding 71 and a secondary winding 78. The output 80 of secondary winding 78 may be connected to circuitry suitable for detecting and decoding the electrical pulses sensed by the secondary winding 78 to produce a control signal to blank and unblank the cathode ray tube video signal amplifiers. The use of a transformer configuration may be convenient to isolate the high current area of the horizontal circuit from the control logic of a monitor.

Figure 9:
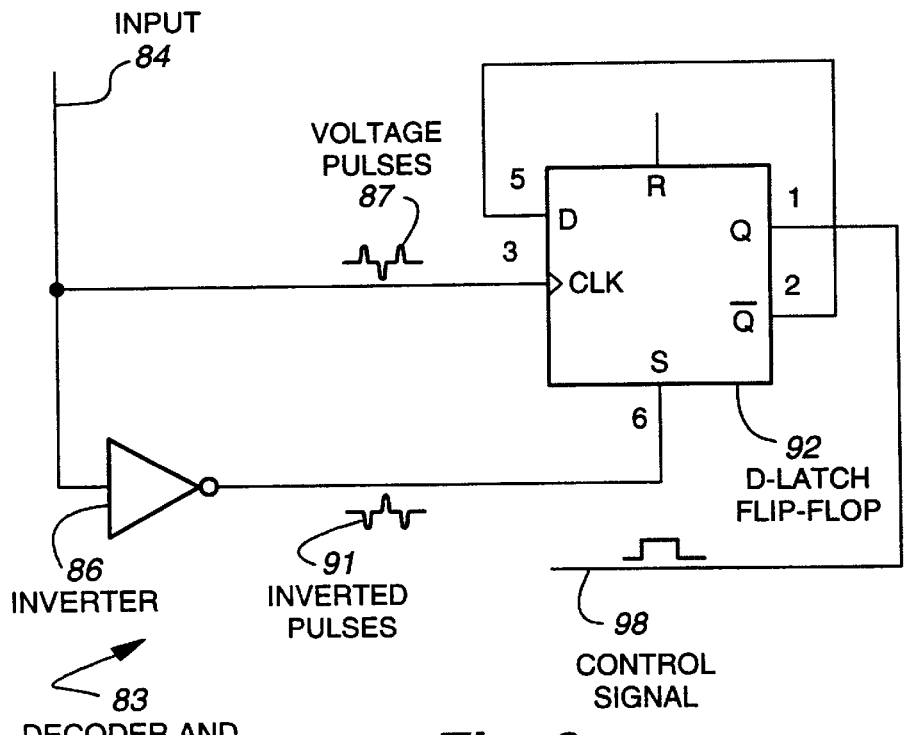
FIG. 9 is a schematic illustration of decoder circuitry for decoding the voltage pulses from a retrace bead inductor or retrace bead transformer.

FIG. 9 is a schematic circuit diagram illustrating one embodiment of decoder circuitry 83 for monitoring the voltage pulses 87 from the retrace bead inductor 72 (FIG. 6) or the retrace bead transformer 81 (FIG. 8) to produce a control signal or output 98 for blanking the video signal amplifiers (not shown) in cathode ray tube devices. The input is coupled to output 80 (FIG. 8) or output 74 (FIG. 6). The input signal 84 is applied to the clock pin 3 on a D-latch flip-flop 92 running in toggle mode. The input signal 84 is inverted by inverter 86, which produces inverted pulses 91 that are applied to set pin 6 of D-latch flip-flop 92. The second or center pulse, in the middle of retrace time, can be used to set the phase of D-latch flip-flop 92 to ensure the correct phase of control signal 98.

Figure 10A:
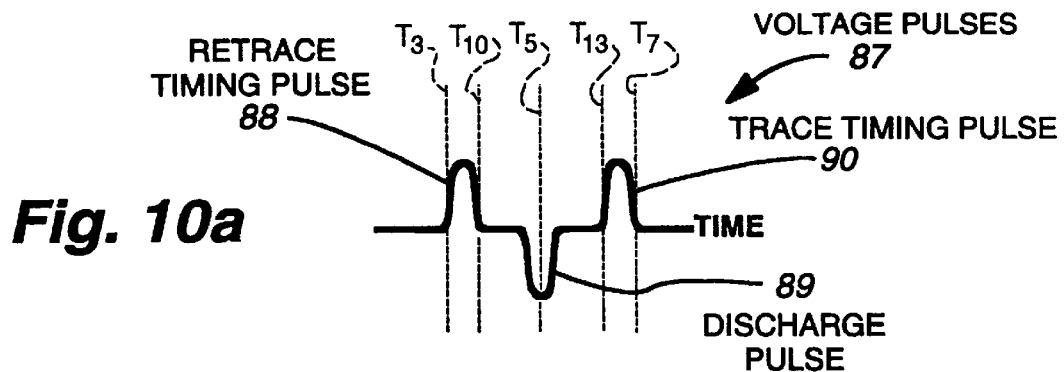
FIGS. 10a through 10c are waveform diagrams which illustrate various pulse vs. time relationships of the present invention.
Figure 10B:
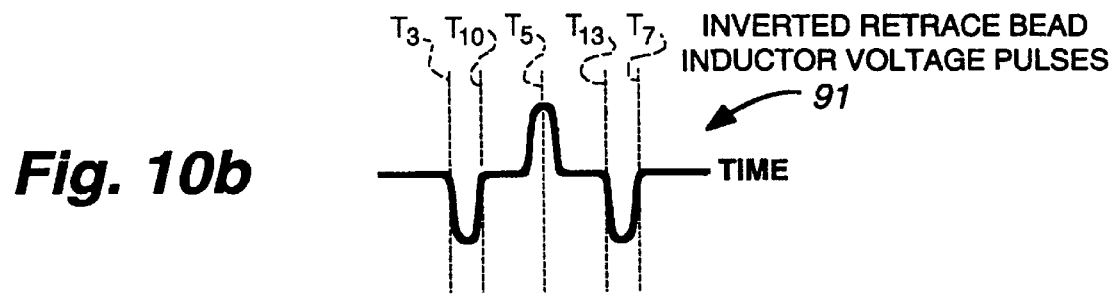
Figure 10C:
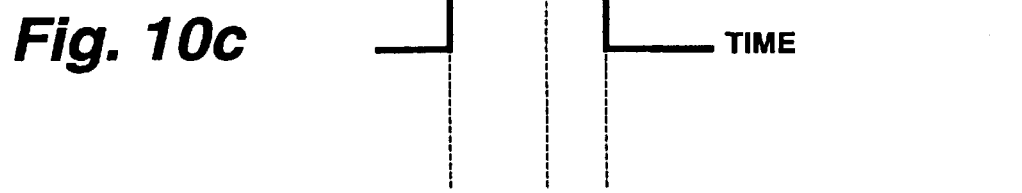
Figure 12:
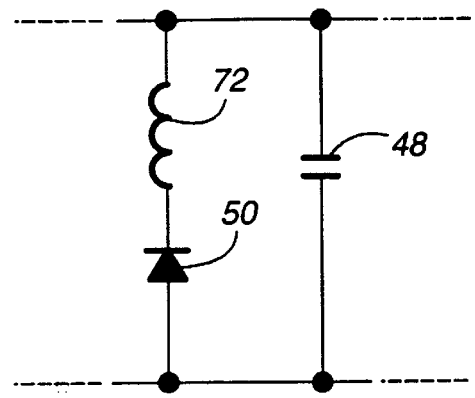
FIGS. 12–15 disclose various locations of the bead inductor to reduce circuit resonance.
Figure 15:
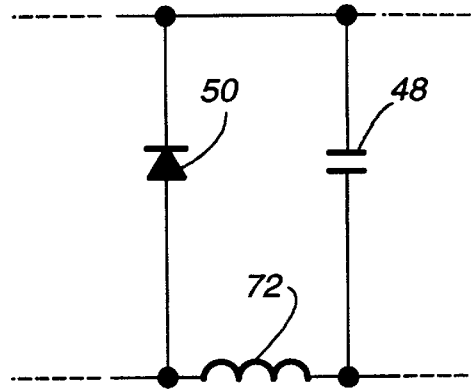
Figure 13:
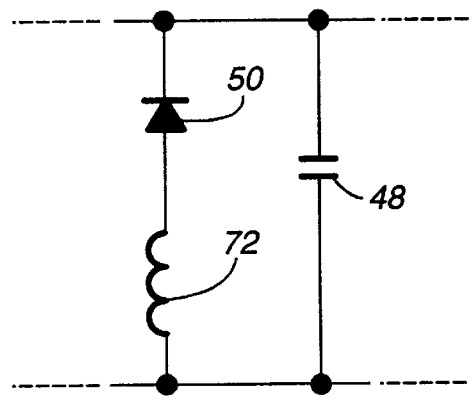

FIGS. 10a through 10c schematically illustrate the manner in which the voltage pulses 87 are used to generate a control signal 98 for triggering blanking pulses to control the video amplifiers. The voltage pulses 87 are decoded by D-latch flip-flop 92. At time T3 when the retrace tuning capacitor 48 begins to charge, the rapid current rise through the retrace bead inductor 72 produces voltage pulse 88, which is used to trigger the rising edge of control signal 98. Centered around T5, discharge voltage pulse 89 is used to set the phase of the D-latch flip-flop 92 if it was not already set. The end of retrace pulse 100 occurs at time T6. Pulse 90 starts at time T13, which triggers the end of control signal 98. It is, therefore, possible to set the timing of the control signal 98 very accurately and to blank the video signal amplifiers precisely.

Figure 11:
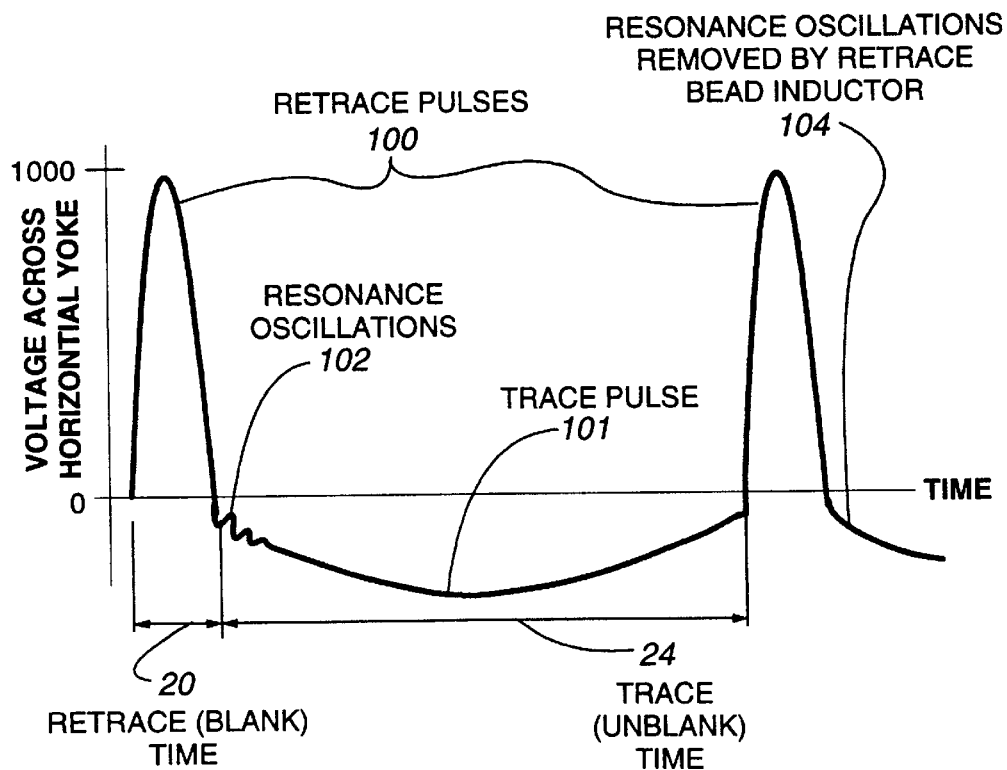
FIG. 11 is a schematic illustration of a voltage versus time waveform for voltage across the horizontal yoke.

FIG. 11 is a graph that illustrates voltage across the horizontal yoke 44 (FIG. 8) versus time. As shown in FIG. 11, resonance oscillations 102 occur in the trace pulse 101 which results in edge distortion in the video image known as left side ringing or velocity modulation. Left side ringing is caused by a resonance oscillation 102 which is the result of the stray inductance of the damper diode 50 and the retrace capacitor 48. If the stray resonant frequency of the circuit that comprises the damper diode 50 and the retrace tuning capacitor 48 is lowered, the left side ringing distortion can be greatly reduced or eliminated in retrace pulse 101 as indicated at point 104. The addition of the retrace bead inductor 72 or retrace bead transformer 81 to this circuit adds inductance and lowers the circuit resonant frequency. Selection of a proper inductance of the retrace bead inductor 72 can minimize or eliminate left side ringing as shown at point 104 on the waveform in FIG. 11. After retrace, the current in the retrace tuning capacitor and bead transformer are nearly zero. This leaves the bead inductor in a high impedance state. This increased inductance state of the retrace bead inductor 72 initially impedes the flow of current to stop the ringing between damper diode 50 and retrace capacitor 48.

Figure 16:
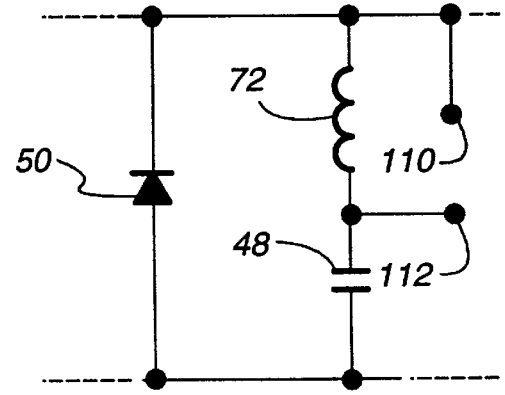
FIGS. 16 and 17 illustrate alternative locations for a bead transformer and a bead inductor.
Figure 14:
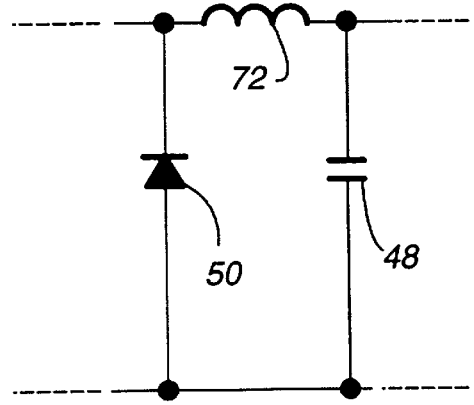
Figure 17:
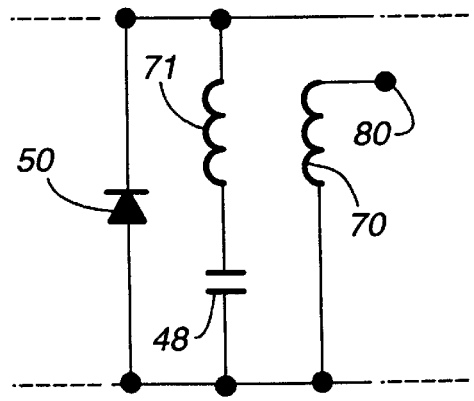

FIGS. 12 through 16 disclose other locations for an inductor 72 to be placed in the circuit formed from dampening diode 50 and retrace tuning capacitor 48. As shown, any location of the inductor 72 in the circuit will function to add inductance and lower the circuit resonant frequency. In addition, FIG. 16 shows the use of inductor 72 in the current path of the retrace tuning capacitor 48. In this manner, voltage outputs similar to output pulses 87 are generated between outputs 110 and 112 that can also be used to generate a control signal 98. FIG. 17 additionally discloses the use of a bead transformer having primary winding 71 and a secondary winding 70. Primary winding 71 provides inductance to the circuit formed of damper diode 50 and retrace tuning capacitor 48. In addition, secondary winding 70 senses the voltage pulses that are generated on primary winding 71 and provides isolated output voltage pulses at output 80.

Figure 18:
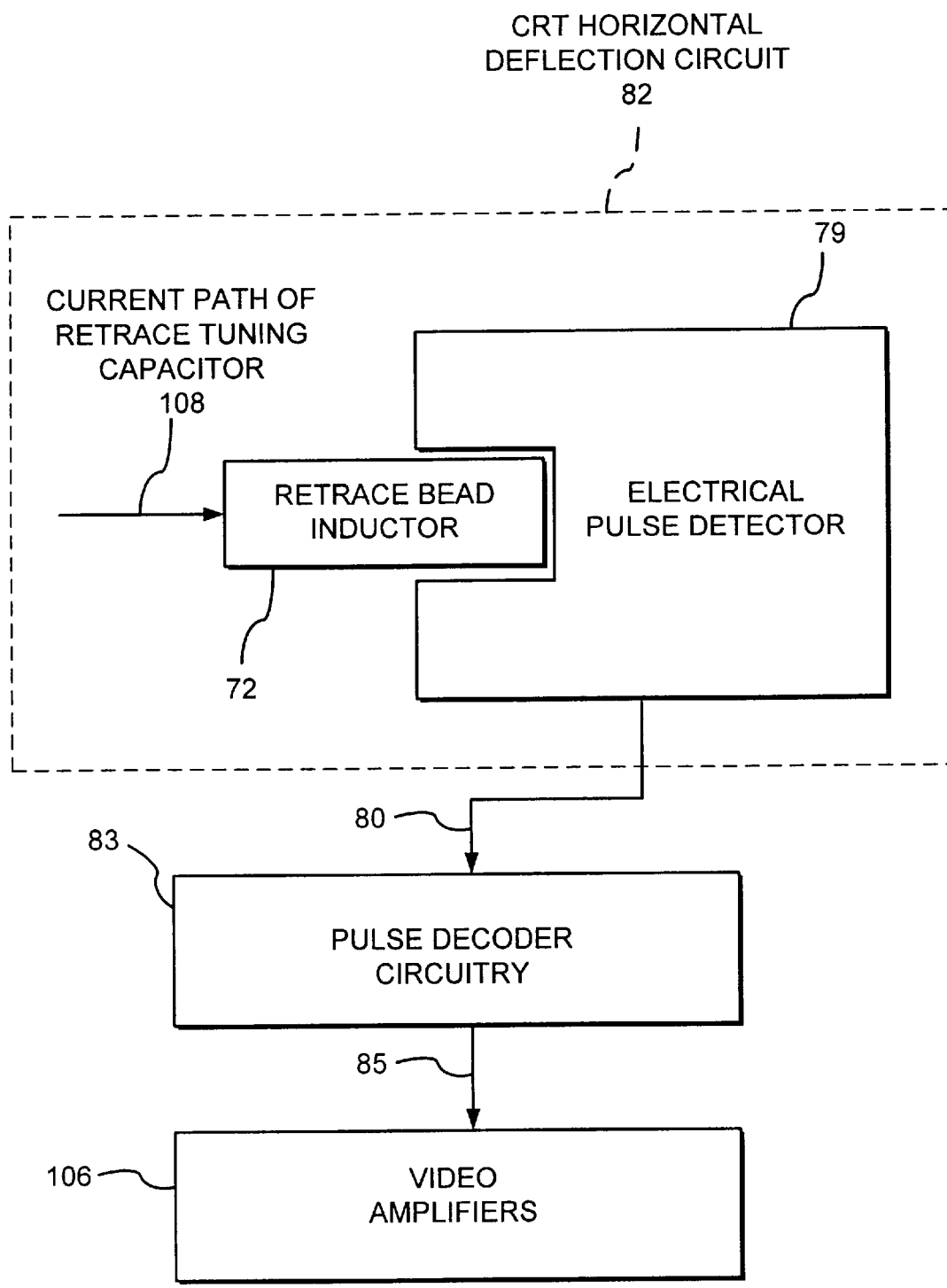
FIG. 18 is a schematic block diagram illustrating key elements of the present invention.

FIG. 18 is a schematic block diagram of the primary components of the present invention. A retrace bead inductor 72, of predetermined size, is located in the current path 108 of retrace tuning capacitor 48 in a CRT horizontal deflection circuit 82. An electrical pulse detector 79, which can comprise any desired device for detecting an electrical pulse generated across bead inductor 72 is used to sense electrical pulses produced by the retrace bead inductor 72 which are then transmitted to pulse decoder circuitry 83 via line 80.

Pulse decoder circuitry 83 then uses the voltage pulses to generate a precisely timed control signal that is transmitted to video amplifiers 106 via connector 85 to control the operation of video amplifiers 106.

The present invention, therefore, provides a novel and unique method and apparatus for generating timing pulses that can act as control signals in a cathode ray tube monitor indicating the beginning and/or end of a trace with a high degree of accuracy. The control signals can then be used to switch the video amplifiers in an extremely accurate manner. As an additional benefit, the current invention also reduces left side ringing distortion.

The foregoing description of the invention has been presented for the purposes of illustration and description. It is not intended to be exhaustive or to limit the invention to the precise form disclosed, and other modifications may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims to be construed to include other alternative embodiments of the invention, except insofar as limited by the prior art.

What is claimed is:

1. An apparatus for generating a control signal in response to precisely timed electrical pulses produced in a cathode ray tube horizontal deflection circuit including a first inductor that is a flyback inductor, said apparatus comprising:
    a second inductor placed in series with a retrace tuning capacitor that produces said precisely timed electrical pulses; and
    decoder circuitry that generates said control signal in response to said precisely timed electrical pulses in said cathode ray tube horizontal deflection circuit.

2. The apparatus of claim 1 wherein said decoder comprises:
    a D-latch flip-flop circuit that is triggered by said precisely timed electrical pulses.

3. An apparatus for generating precisely timed voltage pulses in a cathode ray tube horizontal deflection circuit having a retrace tuning capacitor for controlling a video amplifier comprising:
    a bead inductor placed in series with the retrace tuning capacitor of said cathode ray tube horizontal deflection circuit such that said precisely timed voltage pulses are generated across said bead inductor, said bead inductor having an inductance that causes said bead inductor to saturate before full yoke current;
    a detector that senses said precisely timed voltage pulses generated across said bead inductor; and
    a decoder that generates a control signal in response to said precisely timed voltage pulses to control the operation of said video signal amplifier.

4. The apparatus of claim 3 wherein said detector comprises a bead transformer.

5. The apparatus of claim 3 wherein said decoder comprises:
    a D-latch flip-flop circuit to interpret said precisely timed voltage pulses;
    an inverter to generate an inverted form of said precisely timed voltage pulses for setting the phase of said control signal.

6. A method for generating precisely timed voltage pulses in a cathode ray tube horizontal deflection circuit comprising the steps of:
    storing a predetermined amount of energy in an inductor placed in said cathode ray tube horizontal deflection circuit to produce a first voltage pulse across said inductor;
    releasing said predetermined amount of energy stored in said inductor;
    storing a substantially equal amount of energy in said inductor to produce a second voltage pulse across said inductor; and
    using said first voltage pulse to indicate the beginning of a horizontal trace and said second voltage pulse to indicate the end of said horizontal trace.

7. The method of claim 6 further comprising the step of:
    placing a bead inductor in series with a retrace tuning capacitor.

8. The method of claim 6 further comprising the step of:
    using a bead transformer as said inductor to allow easy detection of said voltage pulses.

9. The method of claim 6 wherein the step of using said voltage pulses further comprises the steps of:
    decoding said first and second voltage pulses to generate a control signal;
    transmitting said control signal to control a video amplifier in said cathode ray tube horizontal deflection circuit.

10. The method of claim 6 further comprising generating a third pulse of said voltage pulses substantially coinciding with a change in direction a current through a retrace tuning capacitor during said horizontal trace.

11. The method of claim 10 further comprising inputting said third pulse to a decoder to set the phase of a control signal.

12. A method for generating a timing pulse for use in a cathode ray tube monitor including a first inductor that is a flyback inductor comprising the step of:
    detecting electrical pulses produced across a second inductor placed in series with a retrace capacitor in a horizontal deflection circuit of said cathode ray tube monitor that are generated as the direction of current flow changes through said retrace capacitor; and
    generating said timing pulse in response to said electrical pulses.

13. The method of claim 12 wherein the step of detecting said electrical pulses further comprises the step of:
    using a bead transformer to scale and isolate said electrical pulses produced across said inductor.

14. A method for generating precisely timed electrical pulses in a cathode ray tube monitor including a first inductor that is a flyback inductor comprising the steps of:
    placing a second inductor in series with a retrace capacitor in a horizonal deflection circuit;
    detecting said electrical pulses produced across said second inductor that are generated as the direction of current flow changes through said retrace capacitor.

15. The method of claim 14 wherein the step of detecting said electrical pulses further comprises the step of:
    using a bead transformer to scale and isolate said electrical pulses.

16. The method of claim 14 further comprising the steps of:
    generating a control signal in response to said electrical pulses using a logic circuit to decode said electrical pulses; and
    using said control signal to generate blanking signals for a cathode ray tube horizontal deflection circuit.

17. A method for generating precisely timed electrical pulses in a cathode ray tube monitor comprising the steps of:

storing a predetermined amount of energy in a bead inductor placed in the current path of a retrace tuning capacitor in said cathode ray tube monitor;

detecting electrical pulses generated across said bead inductor as said predetermined amount of energy is stored in said bead inductor;

detecting electrical pulses generated across said bead inductor as said stored energy is released by said bead inductor.

18. The method of claim 19 further comprising the steps of:

generating a control signal using a logic circuit to decode said electrical pulses generated as energy is stored in and released by said bead inductor;

using said control signal to control the operation of video amplifiers in said cathode ray tube monitor.

19. A method for generating precisely timed voltage pulses in a cathode ray tube monitor to control the blanking of a video amplifier in said cathode ray tube monitor comprising the steps of:

placing a bead inductor in a current path of a retrace tuning capacitor in a horizontal deflection circuit of said cathode ray tube monitor;

detecting a first voltage pulse across said bead inductor as said retrace tuning capacitor charges having a first polarity as current begins to flow through said bead inductor in a first direction;

detecting a second voltage pulse across said bead inductor having a second polarity as current reverses directions in said retrace tuning capacitor;

detecting a third voltage pulse across said bead inductor as current again reverses direction in said retrace tuning capacitor;

using said second voltage pulse having said second polarity to set the phase of a logic circuit; and using said logic circuit to generate a blanking pulse in response to said first, second and third voltage pulses.

20. An apparatus for reducing left side ringing distortion in a cathode ray rube horizontal deflection circuit comprising:

an inductor disposed in said cathode ray tube horizontal deflection circuit in series with a retrace turning capacitor, said inductor having an inductance that causes said inductor to saturate before full yoke current.

21. A method for reducing left side ringing distortion in a cathode ray tube horizontal deflection circuit comprising the steps of:

placing a bead inductor of predetermined value, such that said bead inductor saturates before full yoke current, in the current path of a retrace tuning capacitor and a dampening diode disposed in said cathode ray tube horizontal deflection circuit, whereby said bead inductor lowers the circuit resonant frequency.

22. An apparatus for generating blanking signals in a cathode ray tube horizontal deflection circuit including first inductor means that include a flyback inductor, said apparatus comprising:

second inductor means disposed in series with a retrace tuning capacitor for generating precisely timed voltage pulses; and means for generating said blanking signals in response to said precisely timed voltage pulses.

23. An apparatus for reducing left side ringing distortion in cathode ray tube horizontal deflection circuits comprising:

inductor means that saturates before full yoke current for lowering the resonant frequency of a circuit containing a damper diode and a retrace tuning capacitor that forms a part of a cathode ray tube horizontal deflection circuit.

24. An apparatus for generating timing pulses for use in a cathode ray tube monitor comprising:

an inductor disposed in series with a retrace tuning capacitor of a deflection circuit of said cathode ray tube monitor that has a size sufficient to cause said timing pulses to be generated across said inductor to indicate a position of a horizontal retrace, a first of said timing pulses rising and falling across said inductor during a single charging time of said retrace tuning capacitor;

circuitry that utilizes said timing pulses.

25. A method for generating a precisely timed voltage pulse in a horizontal deflection circuit including a damper diode, said method comprising:

placing an inductor in series with a retrace tuning capacitor, such that said inductor and said retrace tuning capacitor are in parallel with said damper diode;

detecting a voltage pulse across said inductor produced by current flowing through said inductor and said retrace tuning capacitor.

26. The method of claim 25 further comprising generating a lagging edge of said voltage pulse by saturating said inductor with current flowing through said inductor and said retrace tuning capacitor.

27. The method of claim 26 further comprising selecting said inductor to have a small inductance such that said voltage pulse is narrow and saturates before full yoke current.

28. An apparatus for generating a control signal in response to a first precisely timed electrical pulse produced in a cathode ray tube horizontal deflection circuit, said apparatus comprising:

an inductor placed in series with a retrace tuning capacitor that produces a precisely timed electrical pulse that rises and falls across said inductor substantially coincident with the beginning of a horizontal retrace; and decoder circuitry triggered by said precisely timed electrical pulse detected across said inductor to generate said control signal.

29. The apparatus of claim 28 wherein said inductor is saturated before full yoke current by current flowing through said retrace tuning capacitor.

30. A method for blanking a video amplifier comprising:

electrically connecting an inductor in series with a retrace tuning capacitor to monitor current through said capacitor;

detecting a voltage pulse across said inductor caused by saturating said inductor with the current flowing through said retrace tuning capacitor and said inductor; and generating a control signal triggered by said voltage pulse to blank said video amplifier.

31. An apparatus for generating a precisely timed voltage pulse in a horizontal deflection circuit comprising:

an inductor placed in series with a retrace tuning capacitor, such that said inductor and said retrace tuning capacitor are in parallel with said damper diode; and detector circuitry that detects a voltage pulse across said inductor produced by a change in current flowing through said inductor and said retrace tuning capacitor.

* * * * *